United States Patent [19]
Tarics

[11] Patent Number: 5,461,835
[45] Date of Patent: Oct. 31, 1995

[54] COMPOSITE SEISMIC ISOLATOR AND METHOD

[76] Inventor: Alexander G. Tarics, 29 Windward Rd., Belvedere, Calif. 94920

[21] Appl. No.: 126,310

[22] Filed: Sep. 24, 1993

Related U.S. Application Data

[63] Continuation-in-part of Ser. No. 75,667, Jun. 11, 1993, abandoned.

[51] Int. Cl.[6] .................................................. F04H 9/02
[52] U.S. Cl. ...................... 52/167.8; 52/167.7; 248/632
[58] Field of Search ........................ 52/573, 167 R, 52/167 EA, 167 B, 167 T; 248/615, 638, 632

[56] References Cited

U.S. PATENT DOCUMENTS

| | | | |
|---|---|---|---|
| 2,660,386 | 11/1953 | Munro | 248/638 |
| 3,245,646 | 4/1966 | Baratoff | 248/632 |
| 5,242,147 | 9/1993 | Kemeny | 248/638 |

*Primary Examiner*—Michael Safavi
*Attorney, Agent, or Firm*—Flehr, Hohbach, Test, Albritton & Herbert

[57] ABSTRACT

A composite seismic isolator for a structure having a column or wall to be supported on a foundation comprising first and second seismic isolators having vertical axes. The first seismic isolator is constructed so that it is relatively soft in a horizontal direction transverse to the vertical axis in comparison to the second seismic isolator. A restraint is provided by the second seismic isolator for restraining transverse movement of the first seismic isolator between predetermined limits. The composite seismic isolator is mounted between the foundation and the wall or column to be supported by the foundation.

15 Claims, 6 Drawing Sheets

COMPOSITE SEISMIC ISOLATOR AND METHOD

This application is a continuation-in-part of application Ser. No. 08/075,667, filed on Jun. 11, 1993, now abandoned.

This invention relates to a composite seismic isolator and method to be used with a structure having a column or wall to be supported on a foundation.

In the past it has been the practice to provide earthquake protection for buildings and other structures by tying them firmly to their foundations to make them strong enough to resist the forces produced by earthquakes. Experience from earthquakes has shown that such designs generate very high earthquake forces in the buildings which often exceed the capacity of the structural system for the building. To prevent of collapse of the buildings during earthquakes, reliance has been had on the ductility of the structural materials utilized in the buildings. Said ductile materials stretch before they break causing buildings subjected to earthquakes to undergo large and permanent inelastic deformations during earthquakes. Although they may not collapse, they are frequently damaged so badly that they are unsafe for occupancy and must be demolished. More importantly, hospitals, communication and emergency operation centers as well as police and fire stations constructed in this manner cannot be used when they are needed most, that is immediately after an earthquake. In addition, it has been found that such seismic engineering practices do not provide protection for the loose contents of buildings, as for example furniture, equipment, supplies and even people in the buildings. Thus, during earthquakes, the buildings constructed in this manner serve as large mixing boxes with the loose contents therein being scrambled. Without protection for such loose contents, buildings cannot remain functional even after a moderate earthquake. Recently, to make building structures more immune to earthquakes, seismic isolation or sometimes called base isolation has been utilized in buildings which are in earthquake-prone areas. In such seismic-isolated buildings, the buildings are detached from the foundations. Shock-absorbing mechanisms typically called seismic isolators are placed between the building and its foundation which prevent most of the destructive horizontal earthquake ground motion from entering the building and thereby not only the building but its loose contents including people are protected. The seismic isolator was heretofore used for such a purpose has a very high vertical stiffness to support the weight of the buildings and low horizontal stiffness to prevent most of the horizontal ground accelerations from being transmitted into the building during an earthquake. Typically the seismic isolators are individually designed for different buildings and as well as for earthquakes of different magnitudes at different locations. As such seismic isolators deflect horizontally during an earthquake, a building mounted thereon moves slowly in one direction and then another by several inches as well as moving torsionally so that, in effect, the building "rolls with the punch," and after a few excursions comes to a stop. Typically, this is a relatively gentle movement and not as jerky and destructive as the movement of an earthquake. Because a building mounted on such seismic isolators moves slowly, the damage caused by whipping action that occurs in the upper stories of conventional structures is eliminated.

Buildings located in close proximity to an earthquake fault experience very large ground accelerations and velocities resulting in very large horizontal displacement of the seismic isolators. In order to keep these lateral displacements within practical limits, the horizontal stiffness of such seismic isolators must be made high. As a result for "minor" and "moderate" earthquakes, the lateral displacement in such stiff isolators is very small and the buildings behave in a manner which is very similar to that in buildings with a fixed base (no seismic isolators). Thus, it is only for "major" earthquakes, which occur less frequently, that the presently designed seismic isolators provide the benefits of seismic isolation. Experience has shown that conventional fixed base buildings can suffer very serious damage even in moderate earthquakes. There is therefore need for a new and improved seismic isolator and method which will protect the buildings, their contents and occupants in "minor" and "moderate" earthquakes as well as in "major" earthquakes.

In general, it is an object of the present invention to provide a composite seismic isolator which can be utilized for protecting structures from "minor" and "moderate" as well as "major" earthquakes.

Another object of the invention is to provide a composite seismic isolator and method of the above character which is comprised of two different seismic isolators, an upper isolator and a lower isolator with the sizes, physical properties and horizontal stiffness of the two isolators being individually designed for each structure.

Another object of the invention is to provide a composite seismic isolator and method of the above character in which the upper seismic isolator can be characterized as being relatively soft in a horizontal direction in comparison to the lower seismic isolator.

Another object of the invention is to provide a composite seismic isolator and method of the above character in which means is provided on the lower seismic isolator for restraining horizontal movement of the upper seismic isolator within predetermined limits.

Another object of the invention is to provide a composite seismic isolator and method of the above character in which the lower isolator is provided with means for preventing lateral displacement of the upper seismic isolator beyond a predetermined lateral distance.

Additional objects and features of the invention will appear from the following description in which the preferred embodiments are set forth in detail in conjunction with the accompanying drawings.

In general, the composite seismic isolator incorporating the present invention is for use with a structure having a column or wall to be supported upon a foundation. It is comprised of first and second seismic isolators having vertical axes. The first isolator is constructed so that it is relatively soft in a direction transverse of the vertical axes in comparison to the second isolator. Means is provided which is adapted to mount the composite isolator between the foundation and the wall or column to be supported by the foundation. Restraining means is provided by the second isolator for restraining transverse movement of the first isolator between predetermined limits.

Figure 2:
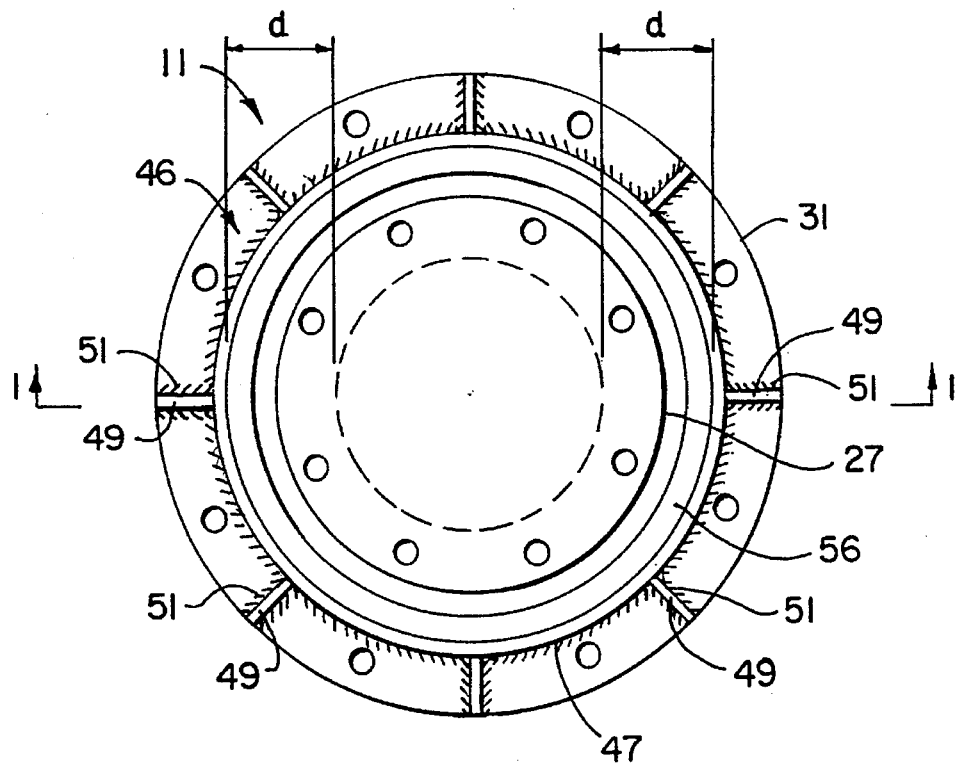
FIG. 2 is a top plan view taken along the line 2—2 of FIG. 1.
Figure 1:
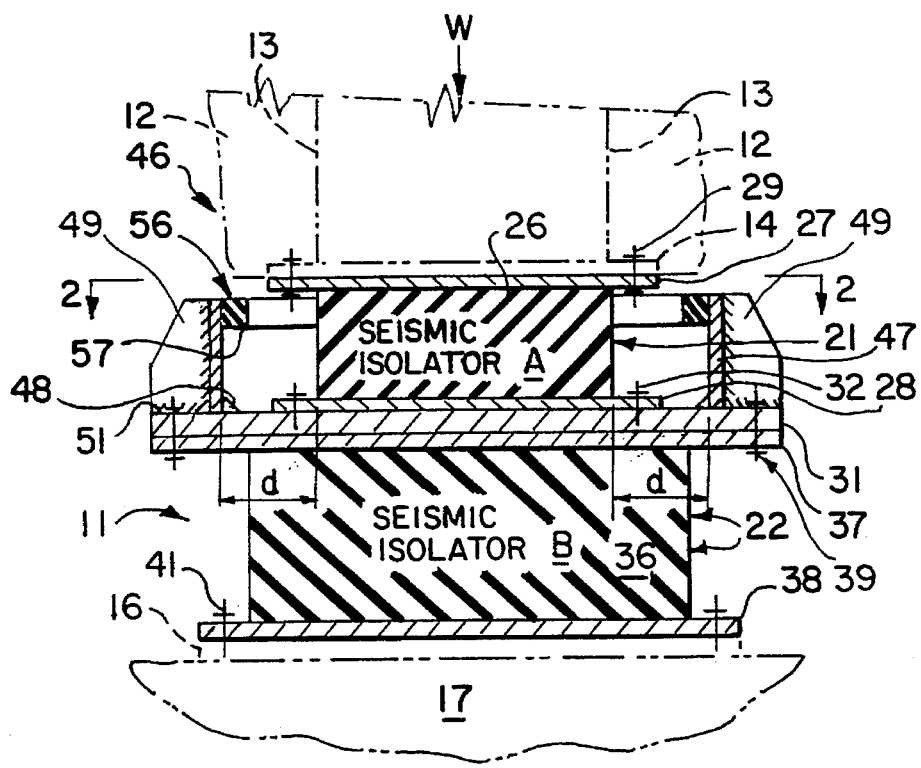
FIG. 1 is a side elevational view in cross section of a composite seismic isolator incorporating the present invention taken along the line 1—1 of FIG. 2.

More in particular, the composite seismic isolator 11 incorporating the present invention is shown in FIGS. 1 and 2 and is used for supporting a structure 12 such as a building which includes a plurality of columns or walls 13 mounted upon a base plate 14 and adapted to be supported by a foundation plate 16 mounted upon a foundation 17 of a typical type, as for example one formed of concrete.

The composite seismic isolator 11 consists of a first or upper seismic isolator 21, also identified as isolator "A" which is mounted upon a second or lower seismic isolator 22, also identified as isolator "B" in the drawings.

The upper seismic isolator 21 or "A" consists of a cylindrical body 26 which has upper and lower circular steel plates 27 and 28 mounted thereon and securely attached thereto. The upper or top plate 27 is adapted to be secured to the plate 14 of the column or wall 13 by suitable fastening means of a conventional type represented schematically at 29. The lower plate 28 is secured to a thicker relatively large intermediate plate 31 and is secured thereto by fastening means 32 also of a conventional type represented schematically at 32.

The lower seismic isolator 22 or "B" also consists of a body 36 which has firmly secured thereto upper and lower steel plates 37 and 38. The upper plate 37 is secured by suitable fastening means to the intermediate plate 31 by suitable fastening means represented schematically at 39 and similarly, the lower plate 38 is secured to the foundation plate 16 by suitable conventional fastening means represented at 41.

The bodies 26 and 36 have vertical axes and can be formed in a conventional manner. For example, one construction commonly used consists of many thin layers (approximately ⅜ inch to ½ inch) which are horizontally disposed with respect to the vertical axis of specially compounded elastomers such as rubber or Neoprene or a combination of the same separated by thin layers (approximately ⅛ inch) formed of steel which are then vulcanized together to form the bodies 26 and 36.

The bodies 26 and 36 are designed with sizes and physical properties including horizontal stiffness which are individually designed for each building. However, the seismic isolator 21 or "A" is designed so it is generally soft horizontally or transverse to the vertical axis whereas the seismic isolator 22 or "B" is designed to be stiffer horizontally or transverse to the vertical axis in accordance with the present invention. Typically the body 26 should be cylindrical in form whereas the body 36 can be also in cylindrical form. However body 36 can have any other desired shape, as for example rectangular if desired.

In the construction shown in FIGS. 1 and 2 it can be seen that the seismic isolator 21 or "A" for the structure or building carries a vertical load "W" placed on the composite seismic isolator or assembly 11 and transfers it to the lower seismic isolator 22 or "B" which in turn transfers it to the foundation 17.

Restraining means 46 is carried by the second or lower seismic isolator 22 or "B" and cooperates with the first or upper seismic isolator 21 or "A" to restrain movement of the upper seismic isolator 21 or "A" within predetermined limit or beyond a predetermined distance in any horizontal or transverse direction or in other words any direction parallel to the plane of intermediate plate 31 represented by the dimension "d" as shown in FIG. 1. This restraining means 46 consists of a cylindrical member in the form of a circular steel cylindrical ring 47 which surrounds the cylindrical body 26 of the upper seismic isolator 21 or "A" and extends to a height which is at least nearly as great as the height of the cylindrical body 26 or in other words is substantially the full height of the cylindrical body 26. However, it must be lower to accommodate some compression caused by loading by the structure. The cylindrical ring 47 has a lower extremity secured to the intermediate plate 31 by suitable means such as welding 48. Additional reinforcement is provided for the cylindrical ring 47 formed of a plurality of circumferentially spaced-apart radially extending gussets or stiffeners 49 which extend outwardly from the cylindrical ring 47 and are welded to the ring 47 and to the plate 31 by welds 51.

A ring assembly 56 of a suitable elastomeric material is secured to the circular cylindrical ring 47 at the upper extremity thereof by suitable means such as an adhesive (not shown) to the interior surface of the circular cylindrical ring 47. The ring assembly 56 cushions contact with the outer margin of body 26 of the upper seismic isolator "A" as the top of the cylindrical body 26 approaches the maximum excursion or distance "d" permitted during an earthquake. It should be appreciated that the top of the body 26 is slightly higher than the height of the circular cylindrical ring 47 to accommodate some vertical deflection of the upper seismic isolator "A" under vertical load and lateral displacement.

By way of example, a composite seismic isolator or assembly 11 of the type hereinbefore described can be typically designed to support one million pounds by having a diameter in the vicinity of 20–50 inches. The body 26 for the upper seismic isolator 21 or "A" can have a suitable diameter, as for example 30 inches and a height of approximately 12 inches. On the other hand, lower seismic isolator "B" can have a suitable diameter, as for example, 40 inches and a height of 12 inches. The base plate 31 can have a suitable dimension, as for example 48 inches and 1½ to 2 inches thick permitting the mounting of the cylindrical restraining ring 47 thereon with the predetermined distance "d" being approximately eight inches. The horizontal stiffness of the upper seismic isolator 21 or "A" relative to lower seismic isolator 22 or "B" can be such so that the seismic isolator "B" is three or more times stiffer than that of a seismic isolator "A". Thus, seismic isolator "B" can be designed to provide desired horizontal stiffness for a "major" earthquake ranging from 7.0 to 8.3 or greater on the Richter scale whereas the size of the isolator "A" can be designed to accommodate "minor" and "moderate" earthquakes up to 5.0 to approximately 6.9 on the Richter scale. It should be appreciated that in accordance with the present invention, the ratio of stiffness between the upper seismic isolator 21 or "A" and the lower seismic isolator 22 or "B" can range from 1.1 to 100 with a normal ratio of 2 to 6.

However, it should be appreciated that both isolators "A"

and "B" operate together because the seismic isolator "B" also moves in "minor" and "moderate" earthquakes as well except that it moves less than the upper seismic isolator "A". When the upper seismic isolator "A" reaches the extent of travel permitted by the restraining means 46, the upper seismic isolator stops to participate for a short moment of time and thereafter the lower seismic isolator keeps moving. When the lower seismic isolator "B" reaches its maximum displacement, it stops moving momentarily until movement starts again in the opposite direction. However, it should be appreciated that if the composite seismic isolator is designed so that the dimension "d" is small, the upper seismic isolator "A" may reach the restraining means 46 during a "moderate" earthquake as well. In such a situation it cannot be said that the upper seismic isolator "A" accommodates "minor" and "moderate" earthquakes and the lower, "major" earthquakes. It is a composite seismic isolator which accommodates all earthquakes and for that reason there is no arbitrary line between what earthquakes are absorbed by the upper seismic isolator "A" or the lower seismic isolator "B". What is important that the combination of the two seismic isolators "A" and "B" accommodate all earthquakes from "minor" to "major".

Figure 4:
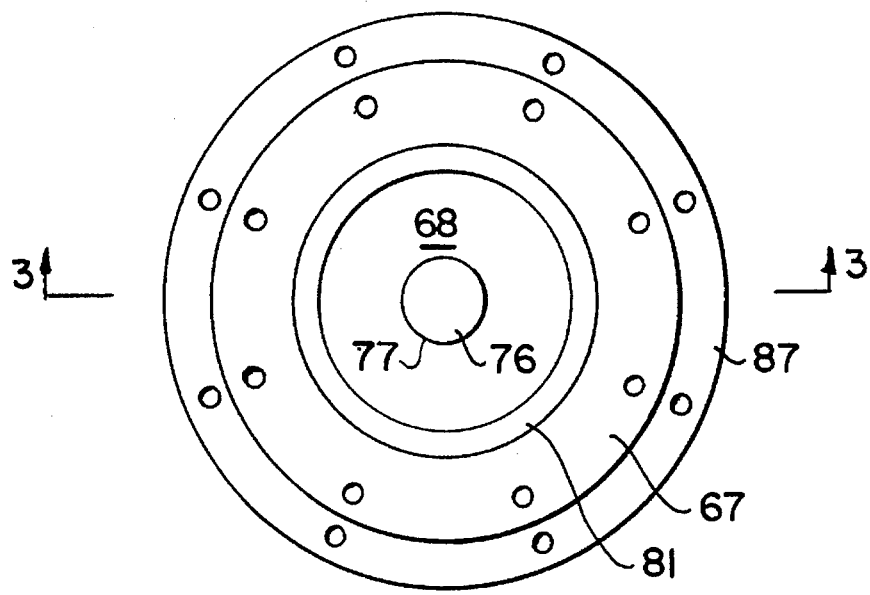
FIG. 4 is a plan view taken along the line 4—4 of FIG. 3.
Figure 3:
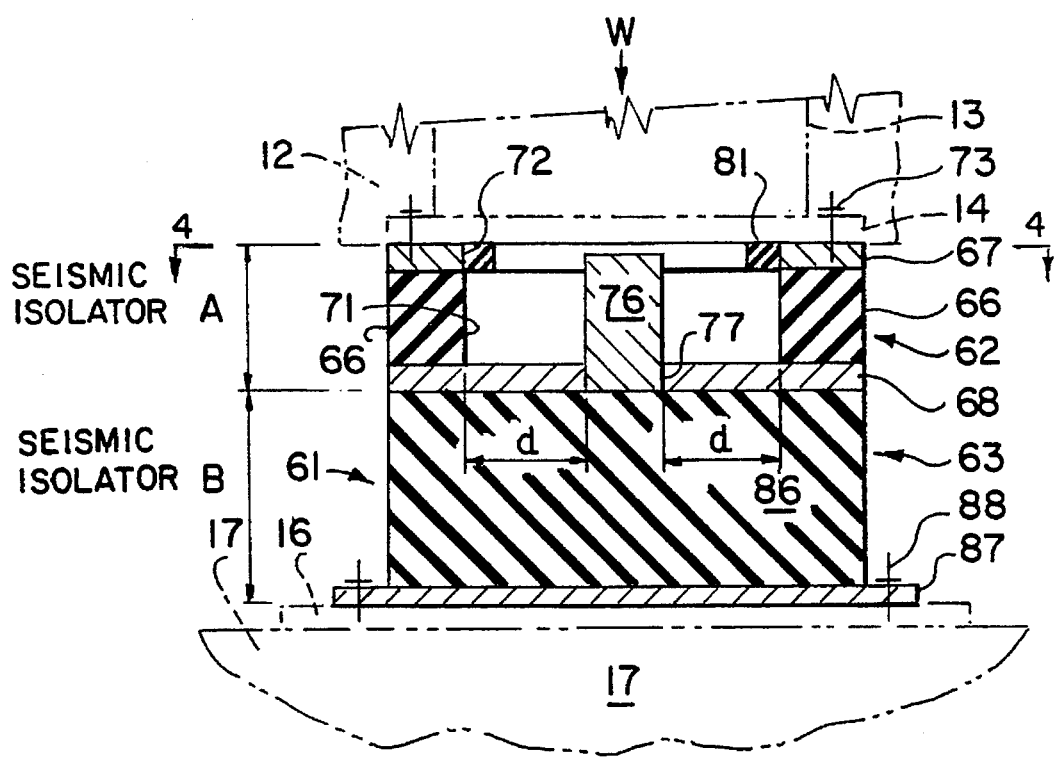
FIG. 3 is a view similar to FIG. 1 taken along the line 3—3 of FIG. 4 showing another embodiment of a composite seismic isolator incorporating the present invention.

Another embodiment of the invention of a composite seismic isolator 61 is shown in FIGS. 3 and 4. As shown therein it consists of a first or upper seismic isolator 62 or "A" and a second or lower seismic isolator 63 or "B". The upper seismic isolator "A" consists of a body 66 which can be cylindrical in shape as hereinbefore described for the body 26 and which has a top or upper steel plate 67 and a lower or intermediate plate 68 firmly bonded thereto. The body 66 is formed with a large cylindrical opening 71 extending therethrough and which is in registration with another large circular opening 72 provided in the plate 67. The plate 67 is secured to the base plate 14 of the column or wall 13 by fastening means 73 of the type hereinbefore described. A short cylindrical steel post or column 76 serving on the cylindrical member of the restraining means is centrally disposed in the openings 71 and 72 and is secured to the bottom or base plate 68 in a suitable manner, as for example by mounting the same in a bore 77 provided in the plate 68. As can be seen, the post or column 76 has a height which is less than the height of the opening 72 and as shown can accommodate vertical loading of the composite seismic isolator 61. Thus, it can be seen that the post or column 76 in conjunction with the opening 72 provided in the top plate 67 serves as restraining means for restraining movement of the upper portion of the body 66 beyond a predetermined distance "d". An elastomeric ring 81 of the same type as elastomeric ring 56 is provided within the opening 72 and is secured to the plate 67 and serves to cushion the contact between the post or column 76 and the steel plate 67.

The lower seismic isolator 63 or "B" is provided with a body 86 of the type hereinbefore described and as described therein can be cylindrical or can have any other desired shape. As can be seen in FIG. 3, the body 86 is bonded to the plate 68 and has its lower extremity bonded to a lower plate 87 so that the composite seismic isolator 61 can be provided as a unitary assembly. It should be appreciated that other fastening means can be used such as countersunk screws. The plate 87 is secured to the foundation plate by suitable fastening means 88.

The ratio of horizontal stiffnesses of the body 86 and the body 66 can be of the same character as hereinbefore described in conjunction with the previous embodiment.

Figure 5:
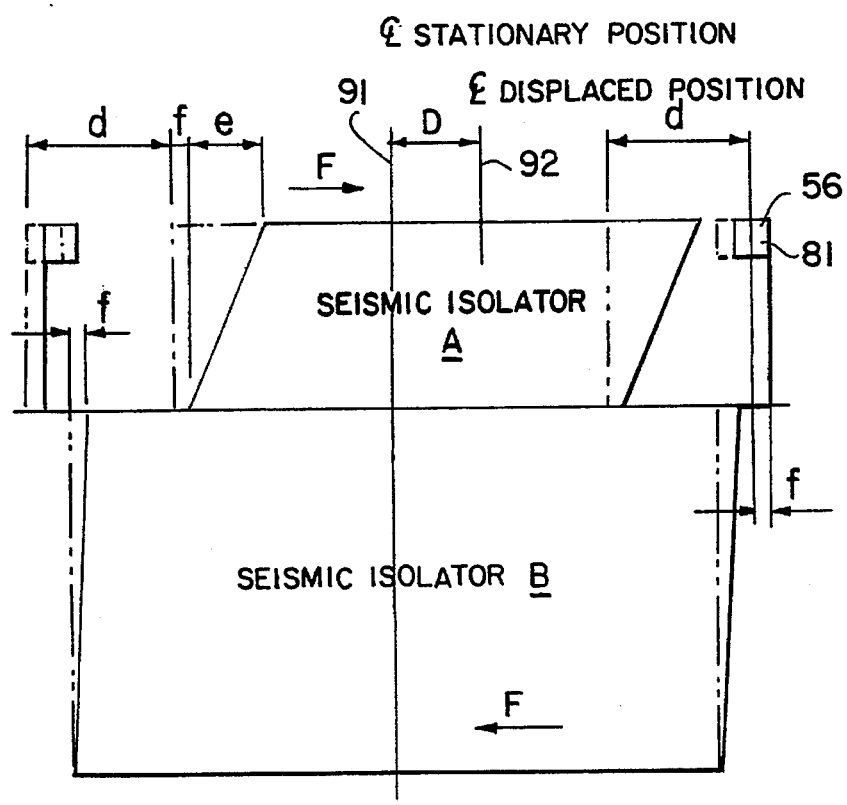
FIG. 5 is a diagram showing the typical lateral displacement positions of the composite seismic isolator incorporating the present invention during "minor" and "moderate" earthquakes when the total lateral displacement demand is less than the predetermined dimension.

In FIG. 5 there is shown a diagram of a typical lateral displacement of the composite seismic isolator of the present invention (during "minor" and "moderate" earthquakes) when the total lateral displacement demand is less than the predetermined dimension "d". The broken line 91 represents the stationary centerline position corresponding to the vertical axes hereinbefore referred to and line 92 represents the centerline of the displaced position. In addition e=displacement of seismic isolator "A"
f=displacement of seismic isolator "B"
D=e+f=total displacement
F=the horizontal earthquake force to be transmitted to the foundation base plate.

Figure 6:
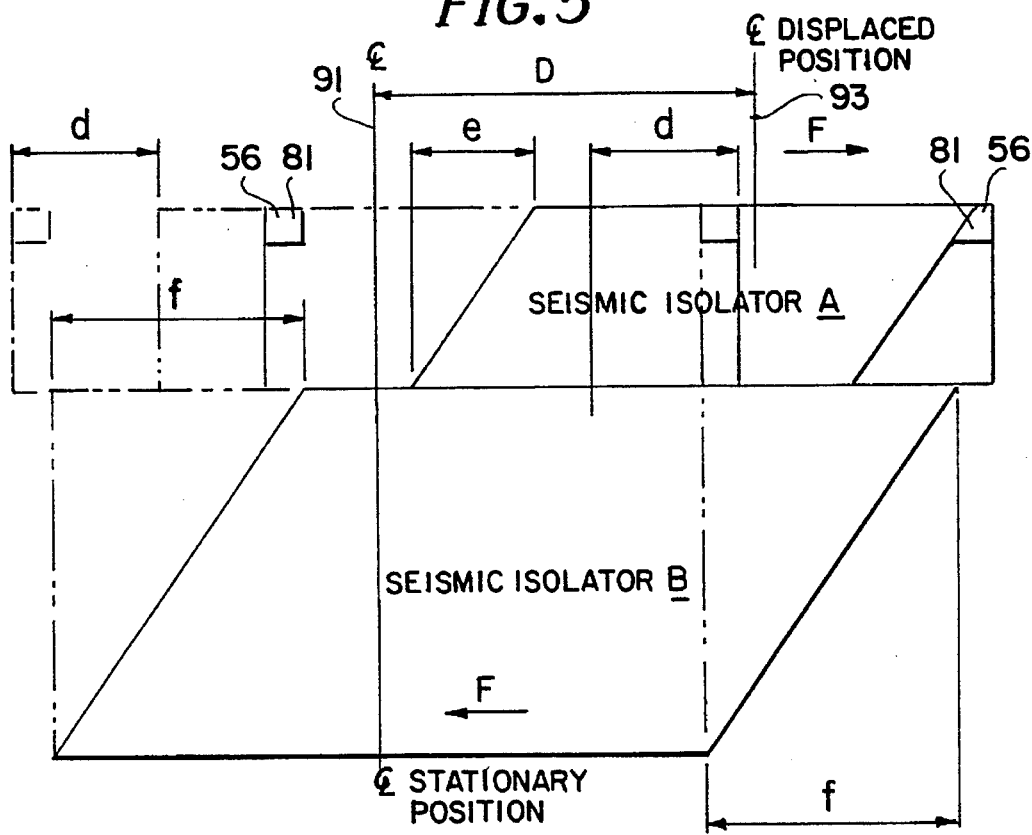
FIG. 6 is a diagram similar to FIG. 5 of the typical lateral displacement of the composite seismic isolator during a "major" earthquake when the total lateral displacement demand is greater than the predetermined dimension.

FIG. 6 is similar schematic diagram similar to FIG. 5 but showing the displacement when the total lateral displacement demand is greater than "d". In this case it can be seen that the extremity of the seismic isolator "A" is positioned against the elastomeric cushion assembly 56 or 81. It is believed there is a smooth transition in the absorption of the force of the earthquake first by the seismic isolator "A" and then to a greater extent by the seismic isolator "B".

Figure 8:
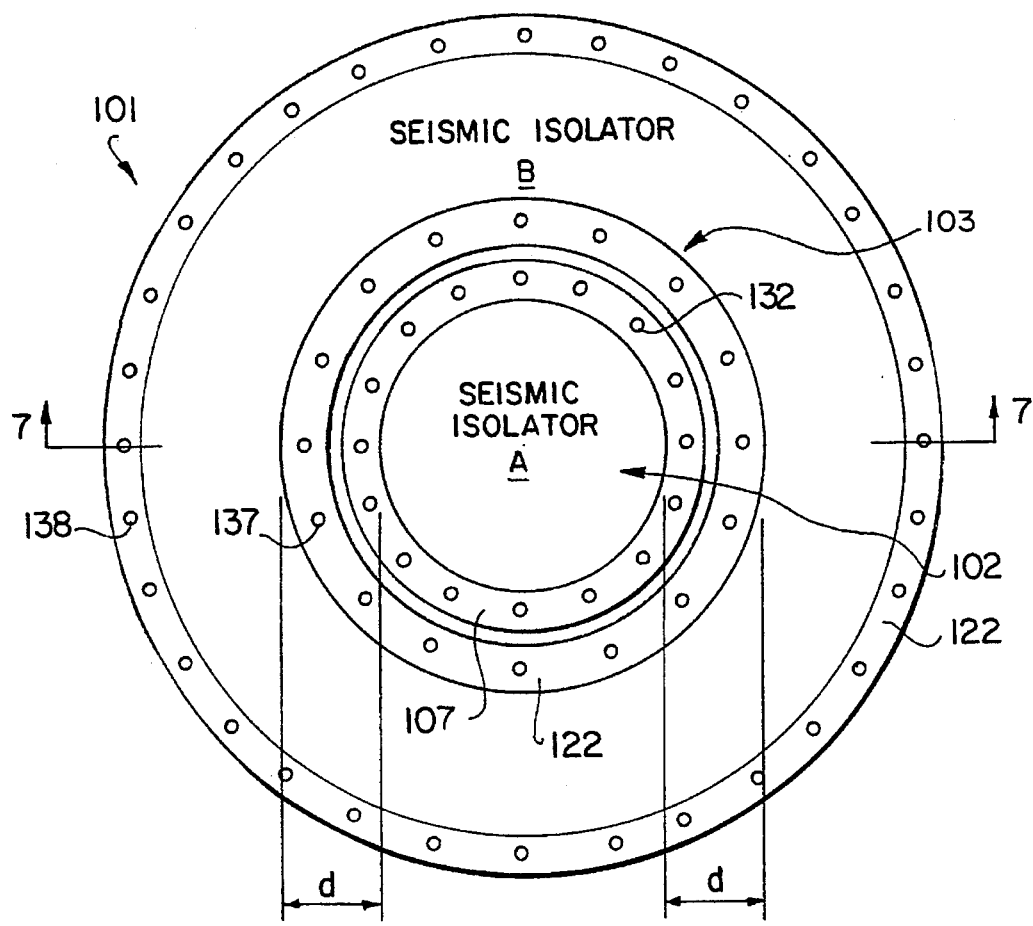
FIG. 8 is a cross-sectional view taken along the line 8—8 of FIG. 7.
Figure 7:
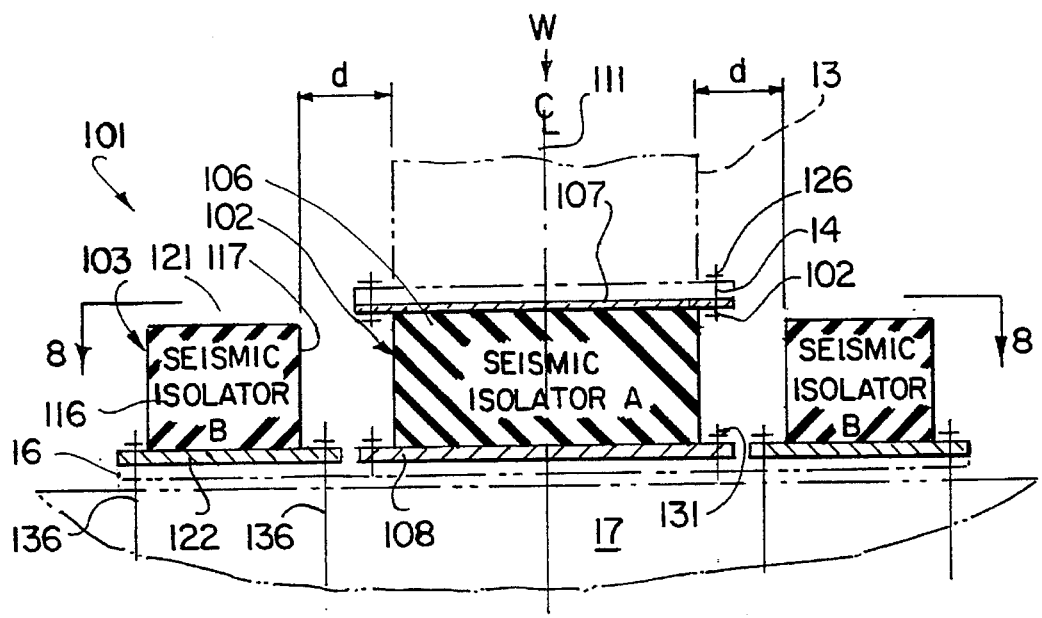
FIG. 7 is a side elevational view in cross section taken along the line 7—7 of FIG. 8 showing another embodiment of a composite seismic isolator incorporating the present invention.

Still another embodiment of the invention of a composite seismic isolator 101 is shown in FIGS. 7 and 8 of the drawings. As shown therein, it consists of a first seismic isolator 102 or "A" and a second seismic isolator 103 or "B". The first seismic isolator 102 or "A" consists of a body 106 which can be cylindrical in shape as hereinbefore described for body 26 and has a top or upper steel plate 107 and a lower steel plate 108 which are firmly attached or bonded thereto in a conventional manner. The body 106 is of a conventional construction and has a vertical axis 111. As shown the body 106 has a diameter so that it is less than that of the plate 107. It should be appreciated that if desired the body 106 can have a diameter the same as the diameter of the plate 107.

The second seismic isolator 103 or "B" is provided with a body 116 of a conventional construction which is a much larger in diameter than the seismic isolator 102 and is provided with a centrally disposed opening 117 of a diameter which is sufficient to accommodate the seismic isolator 102 or "A" so that it can fit therein as shown in FIG. 7. The seismic isolator 103 or "B" has a height so that it terminates below the plate 107 to permit a full range of movement of the seismic isolator 102 or "A" within the seismic isolator 103 or "B". The seismic isolator 103 or "B" is provided with a vertical axis which is coincident with the axis 111 of the seismic isolator 102 or "A" and thus can be characterized as being coaxially disposed with respect to the seismic isolator 102 or "A". A plate 122 is firmly attached in a conventional manner to the lower extremity of the body 116.

Means is provided which is adapted to mount the composite isolator consisting of the first and second isolators 102 and 103 between the foundation 17 and the wall 13 and as shown, the upper plate 107 of the first or seismic isolator 102 or "A" is secured to a plate 14 of a support column 13 by conventional fastening means represented at 126. The lower plate 108 of the seismic isolator 102 or "A" is connected to the base plate 16 secured to the foundation by conventional fastening means represented at 131 which are screwed into the foundation plate 16 and extend through holes 132. Similarly, the lower plate 122 is secured to the foundation plate 16 and to the underlying concrete 17 by the use of conventional fastening means represented at 136 which extend through two sets of inner and outer circumferentially spaced holes 137 and 138 (see FIG. 8).

The ratio of the horizontal stiffness of the body 106 with respect to the body 116 can be of the same character as hereinbefore described in conjunction with the previous embodiments.

The operation of a seismic isolator 101 in accordance with the present invention is very similar to that hereinbefore described in that the seismic isolator 102 or "A" is designed to accommodate "minor" earthquakes whereas seismic isolator 103 or "B" is designed to accommodate "major" earthquakes as hereinbefore defined. However, during "minor" earthquakes, the seismic isolator "A" will absorb all of the load because the columns 13 are supported by the seismic isolators themselves and the seismic isolator 103 or "B" will have no effect. Seismic isolator 103 or "B" will only provide earthquake protection in the event of large earthquakes when the seismic isolator "A" has been moved so that its upper extremity engages the upper extremity of the second seismic isolator 103 or "B" and has further movement restrained by the second seismic isolator 103 or "B".

Figure 9:
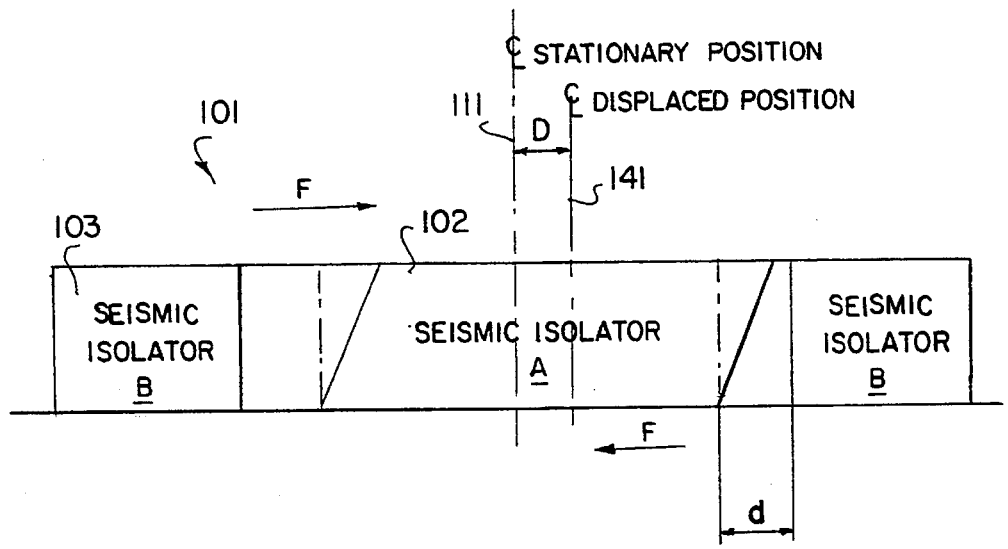
FIG. 9 is a diagram similar to FIG. 5 for the composite seismic isolator shown in FIGS. 7–8.

Thus, it can be seen that the two seismic isolators "A" and "B" can accommodate earthquakes from "minor" to "major". This is demonstrated schematically in the diagrams shown in FIGS. 9 and 10. The horizontal earthquake forces transmitted to the foundation base plate are indicated by the letter "F" and is equal to the total force of the earthquake. FIG. 9 shows the effects of a "minor" earthquakes on the composite isolator 101 in which the vertical axis 111 of the seismic isolator 102 or "A" which corresponds to the centerline is displaced to a line 141 as shown in FIG. 9 during a "minor" earthquake which is insufficient to cause the upper extremity of the seismic isolator 102 or "A" to engage the upper extremity of the seismic isolator 103 or "B". Thus, FIG. 9 is a diagram showing a typical lateral displacement position of the composite seismic isolator 101 during "minor" and "moderate" earthquakes when the total lateral displacement demand is less than the predetermined distance "d" and in which all of the lateral load "F" is resisted by the seismic isolator 102 or "A". The displacement "D" represents the total displacement and the dimension "d" represents the total possible displacement of the seismic isolator 102 or "A" before engaging the seismic isolator 103 or "B".

Figure 10:
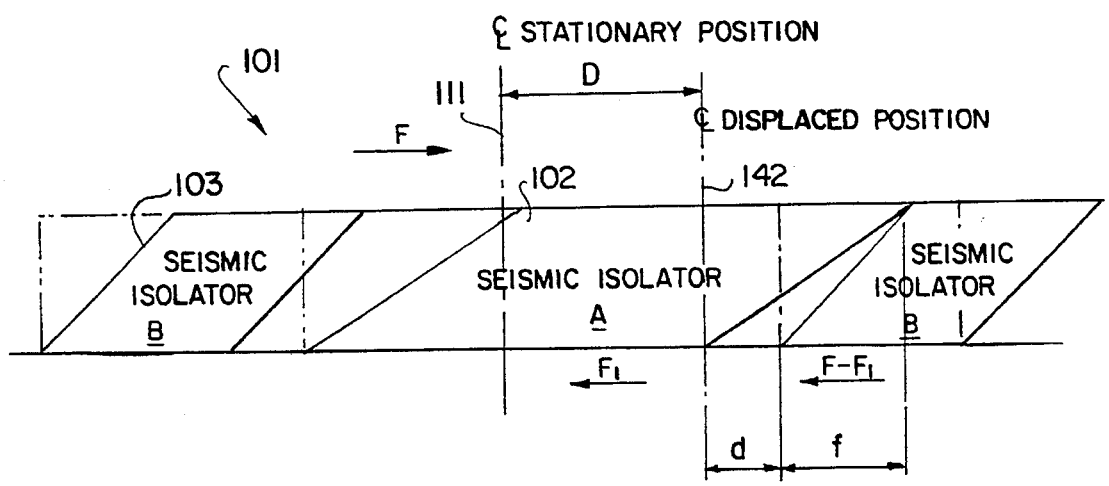
FIG. 10 is a diagram similar to FIG. 6 for the composite seismic isolator shown in FIGS. 7–8.

FIG. 10 is a diagram schematically representing what occurs during a "major" earthquake with the composite seismic isolator 101 in which the centerline 111 has been displaced to another displaced position 142 with the displacement being the total displacement represented by the letter "D".

In a "major" earthquake, the earthquake forces "F" which are transferred to the foundation base plate are equal to "F" in which the portion "F1" is the force transmitted through the lower plate 108 to the base plate 16 whereas the amount of force transmitted by the lower plate 122 of the seismic isolator 103 or "B" is equal to the total earthquake force "F" less the force "F1" transferred to the base plate 16 by the lower plate 108 of the seismic isolator 102 or "A". The total displacement "D" is equal to "d" plus "f" where "d" is the distance from outside of seismic isolator "A" to the inside of seismic isolator "B" and "f" the displacement of the seismic isolator 103 or "B". In other words in a "major" earthquake when the lateral displacement demand is greater than the predetermined distance "d" the seismic isolator 102 or "A" resists that portion of the lateral force "F1" which is required to displace seismic isolator 102 or "A" to the total displacement "D" and seismic isolator 103 or "B" resists the remaining portion of the total lateral force "F"-"F1" with the total displacement "D" being equal to d+f.

The diameter of the hole 117 in the seismic isolator 103 or "B" is equal to the diameter of the seismic isolator 102 or "A" plus 2×"d" where "d" is the diametrical spacing in between the outer surface of the body 106 and the inside diameter of the body 116. The vertical load "W" is carried only by the seismic isolator 102 or "A". The restraint necessary to limit the lateral displacement of the seismic isolator 102 or "A" to the maximum permissible limit is provided by the seismic isolator 103 or "B".

Figure 11:
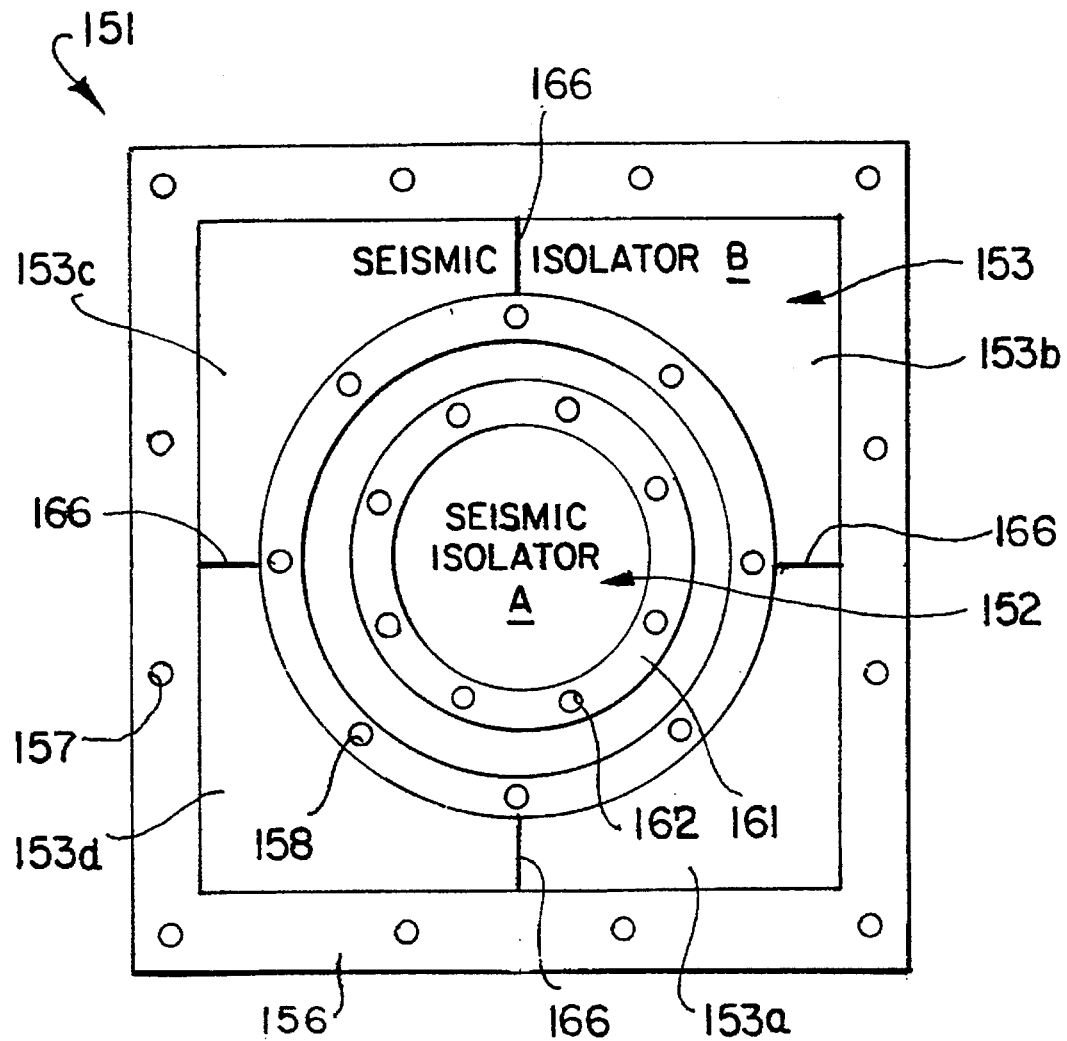
FIG. 11 is a top plan view of another embodiment of a composite seismic isolator incorporating the present invention.

Still another embodiment of the invention is shown in FIG. 11 in which a composite seismic isolator 151 is provided and is comprised of a first or inner seismic isolator 152 or "A" and a second or outer seismic isolator 153 or "B". The construction of the seismic isolator 152 or "A" is substantially identical to the seismic isolator 102 or "A" shown in FIGS. 7 and 8. The second or outer seismic isolator 153 or "B" has a rectangular configuration rather than the circular configuration shown for the seismic isolator 103 or "B" as shown in FIGS. 7 and 8.

The seismic isolator 153 or "B" is provided with a rectangular plate 156 having holes 157 in the outer margin thereof and holes 158 in the inner margin thereof. Similarly, the seismic isolator 152 or "A" is provided with a bottom plate 161 having holes 162 therein. The seismic isolator 153 or "B" can be formed as a single part or alternatively as shown can be segmented by dividing into four quadrants which have been identified as 153a, 153b, 153c and 153d and separated along the lines 166 spaced 90° apart. If desired, fewer or greater number of parts can be provided. By breaking the seismic isolator into parts, it is easier to fabricate the individual parts and then to assemble them into a unitary assembly and hold them together by a top plate (not shown) which is secured to the separate parts 153a-153d to join them into a unitary structure. With such a construction it can be seen that relatively large composite seismic isolators can be provided which have the same features as the other seismic isolators hereinbefore described. It should be appreciated that if desired, the rectangular corners of the seismic isolator construction shown in FIG. 11 can be corners to provide desired seismic isolation effects.

From the foregoing it can be seen that there has been provided a composite seismic isolator by which the maximum horizontal earthquake force is transferred into the composite seismic isolator and that the building or structure supported thereby is protected from "minor" and "moderate" as well as "major" earthquakes while at the same time making the building safe for the contents therein and the people inhabiting those buildings. Such composite seismic isolators can be provided for buildings and structures without greatly increased costs while greatly improving the safety of the building and particularly making it advantageous to utilize such a composite seismic isolator for important buildings which must be capable of remaining in operation after large earthquakes, as for example hospitals, emergency and emergency operating centers and police and fire stations.

What is claimed is:

1. A composite seismic isolator for a building structure having a column or wall to be supported on a foundation comprising first and second seismic isolators having vertical axes, each having upper and lower portions and means disposed between the upper portion and the lower portion of said first and second seismic isolators permitting lateral displacement of the upper portion relative to the lower portion, said first seismic isolator being constructed so that it is relatively soft in a horizontal direction transverse to the vertical axis in comparison to the second seismic isolator, said first seismic isolator having an outer margin, restraining means carried by the second seismic isolator engageable by the outer margin of the first isolator permitting free transverse movement of one of the upper portion or the lower portion of the first seismic isolator within predetermined limits with respect to the second seismic isolator but restraining transverse movement of said one of the upper portion or lower portion of the first seismic isolator beyond said predetermined limits with respect to the second seismic isolator, said one of said upper portion or said lower portion of the second seismic isolator being free to move with respect to the other of said lower portion or the upper portion of the second seismic isolator to permit large lateral displacements and means adapted to mount the composite seismic isolator between the foundation and the wall or column to be supported by the foundation.

2. A composite isolator as in claim 1 wherein said means restraining movement of the first seismic isolator includes means which circumscribes the first seismic isolator.

3. A composite isolator as in claim 1 wherein the first seismic isolator is disposed concentrically within the second seismic isolator and is spaced therefrom in a horizontal direction and wherein said first and second seismic isolators are adapted to be secured to the foundation and wherein said first seismic isolator is adapted to be secured to the column or wall with a horizontal spacing between the first and second seismic isolators being sufficient to permit the first isolator to accommodate lesser magnitude earthquakes, and the first and second seismic isolators in combination being able to accommodate earthquakes of a greater magnitude.

4. A composite seismic isolator as in claim 1 wherein said first seismic isolator is superposed on the second isolator and wherein the means for restraining transverse movement of the first seismic isolator between predetermined limits is comprised of means carried by the second seismic isolator for restraining horizontal movement of the upper extremity of the first seismic isolator beyond the predetermined limits whereby the first seismic isolator accommodates earthquakes of a lesser magnitude and wherein a combination of the first and second seismic isolators accommodate earthquakes of a larger magnitude.

5. A composite isolator as in claim 4 together with an intermediate plate disposed between the first seismic isolator and the second seismic isolator and means carried by the plate for preventing movement of the upper extremity of the first seismic isolator beyond a predetermined distance in any direction parallel to the plate of the intermediate plane.

6. A composite isolator as in claim 4 wherein said first seismic isolator is provided with a cylindrical body and wherein said restraining means includes an intermediate plate and a cylindrical member secured to the intermediate plate having a height which is less than the height of the cylindrical body.

7. A composite isolator as in claim 6 wherein said restraining means includes a cylindrical ring and an elastomeric ring disposed interiorly of the cylindrical ring near the upper extremity thereof adapted to be engaged by the body of the first seismic isolator.

8. A composite isolator as in claim 1 wherein said second isolator has a generally rectangular configuration in plan and is provided with a cylindrical opening therein and wherein said first isolator is disposed within said cylindrical opening.

9. A composite isolator as in claim 8 wherein said second isolator is segmented together with means for holding the segmented second seismic isolator.

10. In the combination of a composite seismic isolator and a building structure, the building structure having a foundation and a column or wall supported on the foundation, the composite seismic isolator comprising first and second seismic isolators having vertical axes, each having upper and lower portions permitting lateral displacement of the upper portion relative to the lower portion, said first seismic isolator being constructed so that it is relatively soft in a horizontal direction transverse to the vertical axis in comparison to the second seismic isolator, said first seismic isolator having an outer margin, restraining means carried by the second seismic isolator engageable by the outer margin of the first isolator permitting free transverse movement of one of the upper portion or the lower portion of the first seismic isolator within predetermined limits with respect to the second seismic isolator but restraining transverse movement of said one of the upper portion or the lower portion of the first seismic isolator beyond said predetermined limits with respect to the second seismic isolator, said second seismic isolator having upper and lower portions, one of said upper and lower portions of said second seismic isolator being free to move transversely with respect to the other of said upper and lower portions of the second seismic isolator to permit large lateral displacements of said one portion of said upper and lower portions with respect to the other of said upper and lower portions of the second seismic isolator and means mounting the composite seismic isolator between the foundation and the wall or column to be supported by the foundation.

11. A combination as in claim 10 wherein said restraining means includes elastomeric means for softening the contact between the restraining means and the upper extremity of the first seismic isolator during an earthquake.

12. A composite seismic isolator for a building structure having a column or wall to be supported on a foundation comprising first and second seismic isolators having vertical axes each having upper and lower portions permitting lateral displacement of the upper portion relative to the lower portion, said first seismic isolator being constructed so that it is relatively soft in a horizontal direction transverse to the vertical axis in comparison to the second seismic isolator, said first seismic isolator having an outer margin, restraining means carried by the second seismic isolator engageable by the outer margin of the first isolator permitting free transverse movement of the upper portion of the first seismic isolator within predetermined limits with respect to the second seismic isolator but restraining transverse movement of the upper portion of the first seismic isolator beyond said predetermined limits with respect to the second seismic isolator, means adapted to mount the composite seismic isolator between the foundation and the wall or column to be supported by the foundation, said first seismic isolator being an upper seismic isolator and said second seismic isolator being a lower seismic isolator, said restraining means including an intermediate plate lying in a plane disposed between the upper seismic isolator and the lower seismic isolator and means carried by the intermediate plate for preventing movement of the upper extremity of the upper seismic isolator beyond a predetermined distance in any direction parallel to the plane of the intermediate plate, the upper portion of the second seismic isolator being free to move in a transverse direction with respect to the lower portion of the second seismic isolator.

13. A composite isolator as in claim 12 wherein said upper seismic isolator is provided with a cylindrical body and wherein said restraining means includes a cylindrical restraining member secured to the intermediate plate having a height which is less than the height of the cylindrical body.

14. A composite isolator as in claim 12 wherein said cylindrical restraining member has an upper extremity together with an elastomeric ring carried by the cylindrical restraining member and disposed interiorly of the cylindrical restraining member near the upper extremity thereof and adapted to be engaged by the upper portion of the upper seismic isolator.

15. A composite isolator as in claim 13 wherein said cylindrical restraining member is in the form of a cylindrical ring which circumscribes the cylindrical body.

* * * * *